(12) United States Patent
Kurose (10) Patent No.: US 7,085,005 B2
(45) Date of Patent: Aug. 1, 2006

(54) METHOD OF AND APPARATUS FOR DISTINGUISHING TYPE OF PIXEL

(75) Inventor: Tsutomu Kurose, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 807 days.

(21) Appl. No.: 09/821,096

(22) Filed: Mar. 30, 2001

(65) Prior Publication Data

US 2002/0051152 A1  May 2, 2002

(30) Foreign Application Priority Data

Mar. 31, 2000  (JP)  ............................. 2000-097226

(51) Int. Cl.
*G06F 15/00* (2006.01)
(52) U.S. Cl. ..................... 358/1.9; 358/2.1; 358/3.1; 358/534; 358/536; 358/538; 358/540
(58) Field of Classification Search ................. 358/1.9, 358/2.1, 3.06, 3.1, 3.23, 534, 536, 538, 540, 358/462; 382/266, 274
See application file for complete search history.

(56) References Cited

U.S. PATENT DOCUMENTS

| | | | | |
|---|---|---|---|---|
| 4,403,257 A | * | 9/1983 | Hsieh | 358/2.1 |
| 4,853,970 A | * | 8/1989 | Ott et al. | 382/266 |
| 4,903,143 A | * | 2/1990 | Sakamoto | 358/3.21 |
| 5,339,172 A | | 8/1994 | Robinson | |
| 5,392,365 A | * | 2/1995 | Steinkirchner | 382/260 |
| 5,452,107 A | * | 9/1995 | Koike | 358/468 |
| 5,572,603 A | * | 11/1996 | Koike | 382/199 |
| 5,699,169 A | * | 12/1997 | Nakatani et al. | 358/3.07 |
| 6,775,031 B1 | * | 8/2004 | Fujiwara | 358/2.1 |

FOREIGN PATENT DOCUMENTS

| | | |
|---|---|---|
| EP | 0 630 149 A1 | 12/1994 |
| JP | 60-051367 A | 3/1985 |
| JP | 62-088478 A | 4/1987 |
| JP | 2(1990)-103684 | 4/1990 |
| JP | 2(1990)-105271 | 4/1990 |
| JP | 02-274174 A | 11/1990 |
| JP | 03-080770 A | 4/1991 |
| JP | 05-048891 * | 2/1993 |
| JP | 05-048891 A | 2/1993 |
| JP | 05-110831 * | 4/1993 |

(Continued)

OTHER PUBLICATIONS

Patent Abstracts of Japan vol. 012, No. 060 (E-584), Feb. 23, 1988. & JP 62 202672 A (Canon Inc.) Sep. 7, 1987 *Abstract*.

(Continued)

*Primary Examiner*—Kimberly Williams
*Assistant Examiner*—Michael Burleson
(74) *Attorney, Agent, or Firm*—Nixon Peabody LLP; Donald R. Studebaker (57) ABSTRACT

Halftone pixels are distinguished from non-halftone pixels in pixels making up an image according to a predetermined algorithm based on a result of edge detection for determining whether the pixels are edge pixels. The pixels which have been determined to be non-halftone pixels according to the predetermined algorithm, are continuous to the pixels determined to be halftone pixels according to the predetermined algorithm including those which have been redetermined to be halftone pixels and are not lower than a predetermined threshold density in density are all redetermined to be halftone pixels.

12 Claims, 11 Drawing Sheets

FOREIGN PATENT DOCUMENTS

| | | |
|---|---|---|
| JP | 05-110831 A | 4/1993 |
| JP | 05-344331 A | 12/1993 |
| JP | 06-152944 A | 5/1994 |

OTHER PUBLICATIONS

European Search Report dated Dec. 15, 2003.

* cited by examiner

PRIOR ART

FIG. 11

METHOD OF AND APPARATUS FOR DISTINGUISHING TYPE OF PIXEL

BACKGROUND OF THE INVENTION

1. Field of the Invention

This invention relates to a method of an apparatus for distinguishing the types of pixels making up an original, and more particularly to a method of and an apparatus for distinguishing the types of pixels making up an original, which are used, for instance, in a stencil printer which makes a stencil by imagewise perforating a heat-sensitive stencil material and a print is made from the stencil, and a copier or a printer in which a latent image is formed on a photosensitive medium by electrophotography or the like and a toner image obtained by developing the latent image is transferred to a printing paper or a heat-sensitive paper.

2. Description of the Related Art

In the fields of plate making and printing, there has been put into practice a process in which an original, in which binary images such as a line drawing and characters and tone images such as a picture and halftone dots mingle together (such an original will be referred to as a "complex original", hereinbelow), is read by an image scanner, a multivalued image signal sampled in a main scanning direction and a sub-scanning direction pixel by pixel is obtained, the multivalued image signal is converted into a binary image signal, and a plate or a print is made from the binary image signal.

In order to obtain a desirable output when a complex original is output through an image processing apparatus, generally, the region of the binary image is subjected to a binary image density conversion in which the density of each pixel is converted to a maximum density or a minimum density on the basis of a single threshold value, the region of the tone image is subjected to a tone image density conversion in which the density of each pixel is converted taking into account the properties of the input/output system so that the tone properties of the original image are preserved, and then the region of the binary image is binary-coded by a simple binary-coding method using a single threshold value while the region of the tone image is binary-coded by a pseudo-halftone expressing method such as a dither method and an error diffusion method. Further, since moiré is apt to be generated when a halftone picture is binary-coded by the dither method, it is not preferred that the picture region and the halftone region are subjected to density conversion by the use of the same characteristics and are binary-coded by the same method.

Accordingly, it is necessary to determine the type of each region, that is, to distinguish the binary image region such as a character region from the tone image region such as a halftone region and a picture region. In other words, it is necessary to distinguish the type of each pixel (the type of image which the pixel makes up) and to carry out on each pixel image processing suitable to the type of pixel. For example, pixels of a binary image should be subjected to a density conversion for a binary image so that characters are output to be high indensity and pixels of a tone image should be subjected to a density conversion for a picture or a halftone image so that the tone properties of the original image are preserved.

When a complex original is used, it is necessary to precisely distinguish the types of pixels, that is, to distinguish pixels of a character, pixels of a picture or pixels of a halftone image from each other, for an image signal of one frame corresponding to one sheet of original, and to carry out image processing optimal to each type of pixels. There have been proposed various methods of distinguishing the character region, the picture region and the halftone region from each other.

For example, as a method of distinguishing whether a pixel is of a half tone region, there have been proposed various methods as follows. In the method disclosed, for instance, in Japanese Unexamined Patent Publication Nos. 2(1990)-274174 and 5(1993)-344331, whether a pixel is of a halftone region is determined on the basis of the number of edges in a reference region of a predetermined size. In the method disclosed, for instance, in Japanese Unexamined Patent Publication Nos. 60(1985)-51367, 62(1987)-88478, 5(1993)-48891 and 6(1994)-152944, whether a pixel is of a halftone region is determined on the basis of information on the space between edges or extremes (a maximum or a minimum) of density. In the method disclosed, for instance, in Japanese Unexamined Patent Publication Nos. 3(1991)-80770 and 5(1993)-110831, whether a pixel is of a halftone region is determined pattern matching.

Figure 11:
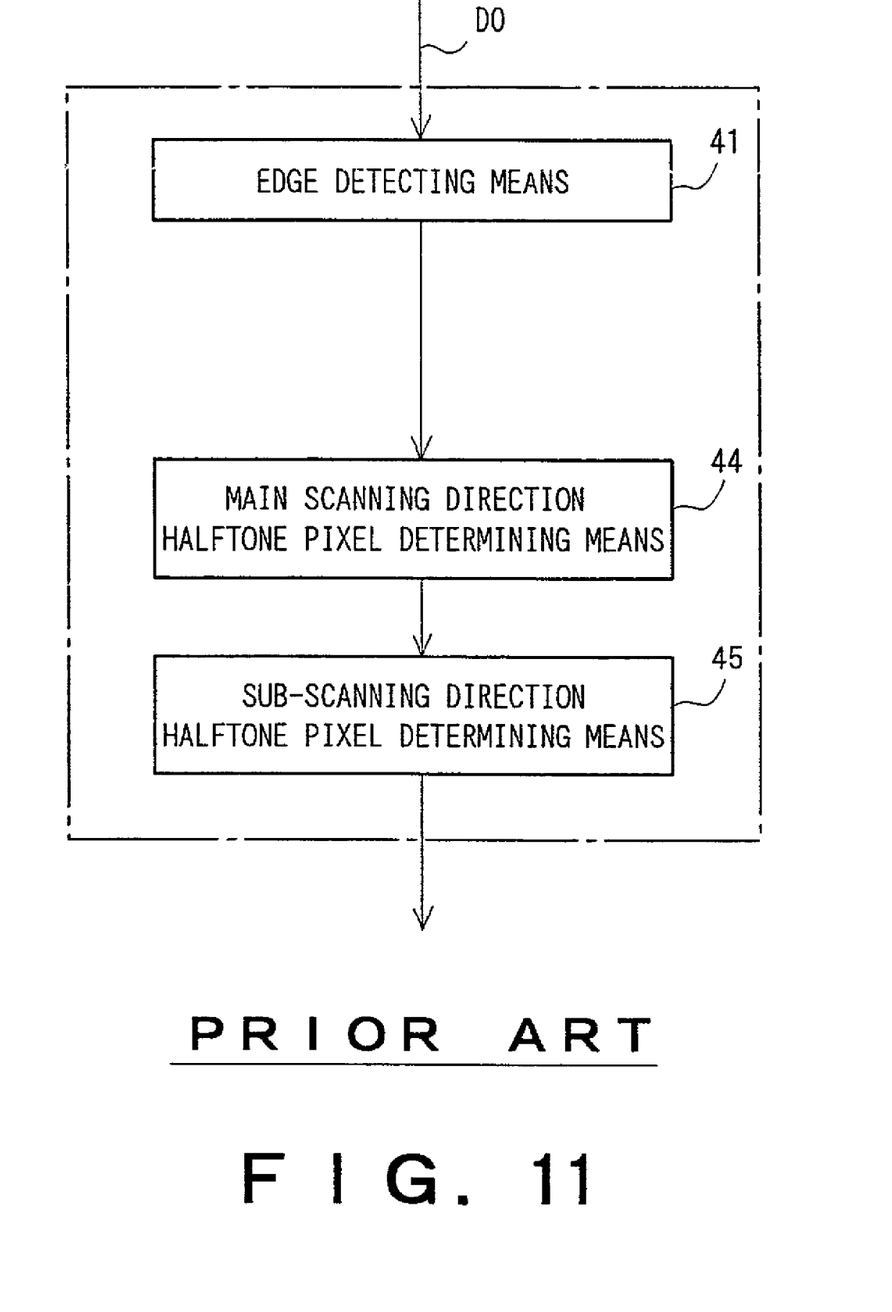
FIG. 11 is a view showing a convention halftone pixel determining apparatus.

As an apparatus for carrying out the method in which whether a pixel is of a halftone region is determined on the basis of the number of edges in a reference region of a predetermined size, there has been known an apparatus shown in FIG. 11. As shown in FIG. 11, the apparatus comprises an edge detecting means 41, a main scanning direction halftone pixel determining means 44 and a sub-scanning direction half tone pixel determining means 45.

In the apparatus, whether a pixel is of a halftone region is determined according to an algorithm that the halftone region differs from the character region and the silver halide picture region in number and arrangement of edges.

Specifically, the edge detecting means 41 detects edges on the basis of the values of a designated one of pixels and a plurality of pixels near the designated pixel (will be sometimes referred to as "the neighbor pixels", hereinbelow) with substantially all the pixels designated in sequence. The main scanning direction halftone pixel determining means 44 determines, on the basis of the result of edge detection by the edge detecting means 41, a region where at least a predetermined number of edges are arranged on one main scanning line spaced from each other within a predetermined distance to be a prospective halftone region, and takes the pixels in the prospective halftone region as prospective halftone pixels. Since a larger number of edges exist in the halftone region than in the character region and the picture region, the former can be distinguished from the latter by this processing. Then the sub-scanning direction halftone pixel determining means 45 counts a number of the prospective halftone pixels in a reference region which includes one pixel in the main scanning direction and a predetermined number of pixels in the sub-scanning direction with a designated pixel at the middle thereof, and determines the designated pixel to be a halftone pixel when the number of the prospective halftone is not smaller than a predetermined threshold value. Even pixels which are determined to be a prospective halftone pixels by the main scanning direction halftone pixel determining means 44 are not determined to be a halftone pixel unless the pixel satisfies the condition in the sub-scanning direction. That is, according to this algorithm, whether each pixel is a halftone pixel is determined on the basis of the result of edge detection.

Figure 3A:
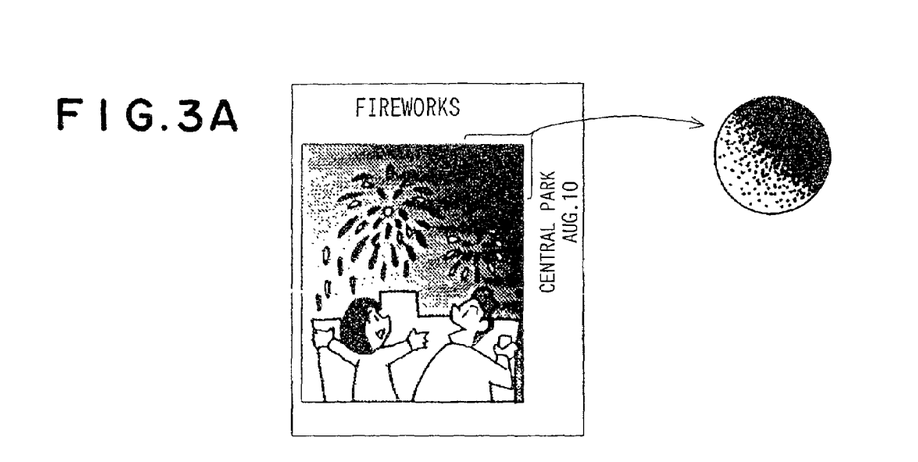
FIG. 3A is a view showing an example of original.
Figure 3B:
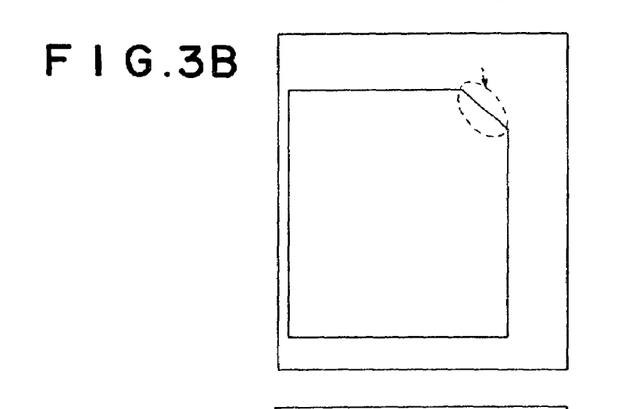
FIG. 3B is a view for illustrating the drawback when the pixel type distinguishment is carried out on the original shown in FIG. 3A according to the conventional algorithm.
Figure 4A:
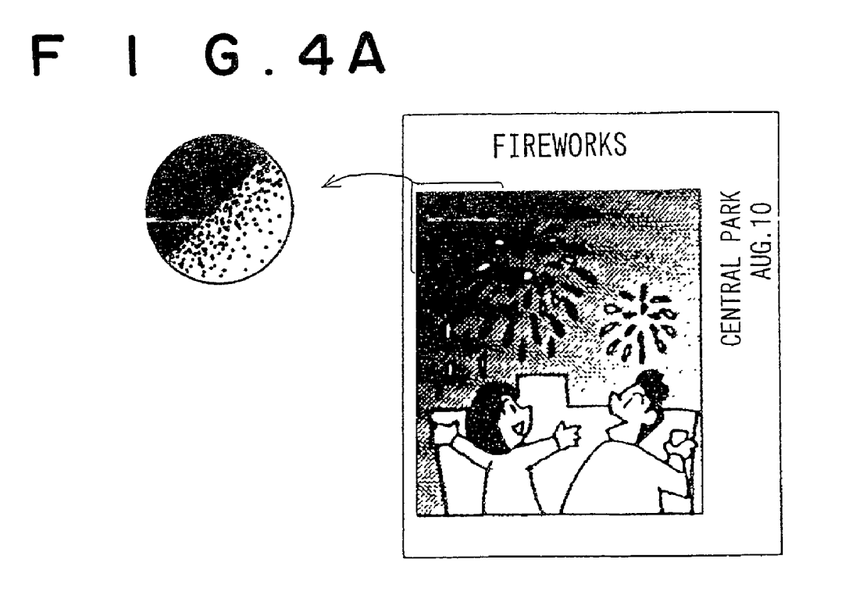
FIG. 4A is a view showing another example of original.
Figure 4B:
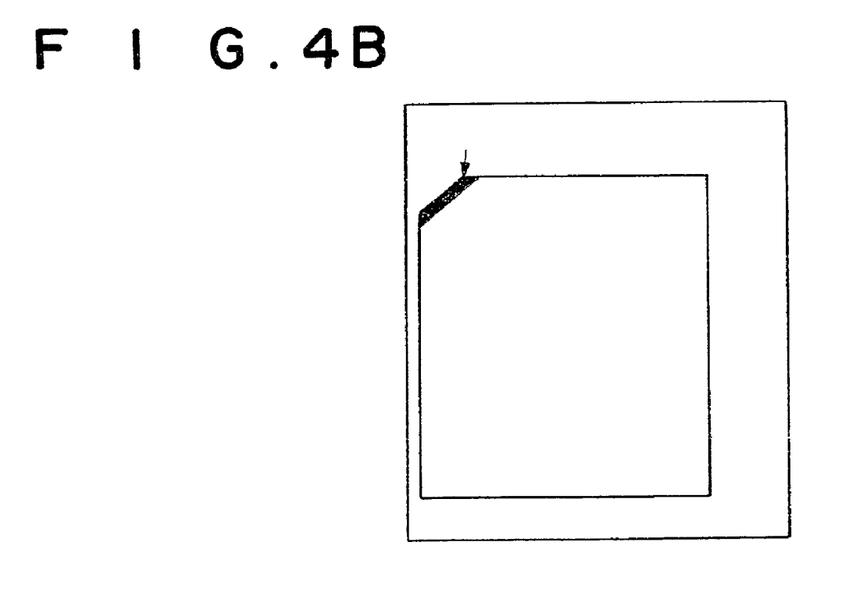
FIG. 4B is a view for illustrating an example of drawback caused when the pixel type distinguishment is carried out according to the conventional algorithm.

Some halftone pictures have a relatively high density portion which is expressed by a number of ink dots (such a portion will be referred to as "a solid portion", hereinbelow) and smoothly merges into a halftone region expressed by halftone dots as shown in FIGS. 3A and 4A. When distinguishment of the type of pixel is carried out on a complex original including a halftone picture having such a solid portion according to the conventional algorithm, the solid portion is not determined to be a halftone region (a tone image region) but determined to be a non-halftone region, e.g., a character region (a binary image region), since there is detected no edge component in the solid portion as shown in FIG. 3B.

When the image signal of the original is converted into a binary image signal on the basis of the distinguishment, the solid portion is subjected to the binary image density conversion and is output to be high in density while the halftone region is output to be lower in density than the solid portion. As a result, a sharp difference in density is generated between the solid portion and the halftone region, which gives an observer a sense of incompatibility.

SUMMARY OF THE INVENTION

In view of the foregoing observations and description, the primary object of the present invention is to provide a method of and an apparatus for distinguishing the types of pixels which can distinguish halftone pixels (pixels in a halftone region) from non-halftone pixels (pixels in a region other than the halftone region) so as not to generate a sharp difference in density between the solid portion and the halftone region.

In accordance with a first aspect of the present invention, there is provided a method of distinguishing halftone pixels from non-halftone pixels in pixels making up an image according to a predetermined algorithm based on a result of edge detection for determining whether the pixels are edge pixels, wherein the improvement comprises that the pixels which have been determined to be non-halftone pixels according to said predetermined algorithm, are continuous to the pixels determined to be halftone pixels according to said predetermined algorithm including those which have been redetermined to be halftone pixels and are not lower than a predetermined threshold density in density are all redetermined to be halftone pixels.

The expression "pixels are continuous" means that two pixels are positioned near each other within a predetermined pixel interval distance (the distance as represented by the number of pixel intervals, e.g., when the two pixels are positioned adjacent to each other without pixel intervening therebetween, then the distance therebetween is one pixel interval distance) That is, in this specification, in order to be expressed that the two pixels are continuous, the two pixels need not be directly adjacent to each other (strictly speaking, pixels are inherently discontinuous) but have only to be positioned within a predetermined pixel interval distance, that is, may be positioned with one or more pixels intervening therebetween. For example, the predetermined pixel interval distance is set to be 2 pixel interval distance, 24 adjacent pixels around each pixel are considered to be continuous with the pixel.

In accordance with a second aspect of the present invention, there is provided a method of distinguishing halftone pixels from non-halftone pixels in pixels making up an image according to a predetermined algorithm based on a result of edge detection for determining whether the pixels are edge pixels, wherein the improvement comprises that each of the pixels which have been determined to be non-halftone pixels according to said predetermined algorithm and are not lower than a predetermined threshold density in density is redetermined to be a halftone pixel when the number of pixels which have been determined to be halftone pixels according to said predetermined algorithm including those which have been redetermined to be halftone pixels in a predetermined region including therein the relevant pixel is larger than a predetermined threshold number, the pixel to be determined whether it is redetermined to be a halftone pixel being shifted in sequence.

The pixels which are determined to be non-halftone pixels according to said predetermined algorithm will be referred to as "prospective non-halftone pixel", hereinbelow.

The predetermined region need not include the designated (relevant) pixel in its center but may include the designated pixel in any part thereof.

The predetermined threshold number may be determined according to the size of the predetermined region and may be, for instance, 10 to 20% of the total number of pixels included in the predetermined region, though it is preferred that the predetermined threshold number be large enough to accurately correct the designated prospective non-halftone pixel to a halftone pixel even when prospective non-halftone pixels are included only on one side of the designated prospective non-halftone pixel.

When determining whether the number of halftone pixels in said predetermined region is larger than the predetermined threshold number, for example, a pixel at the starting point of the main scanning or the sub-scanning direction is first designated (as the pixel to be determined whether it is redetermined to be a halftone pixel) and aforesaid processing is executed on the designated pixel. Then when the processing is completed, the aforesaid processing is repeated with the designated pixel shifted by one pixel in the main scanning direction or the sub-scanning direction. After the aforesaid processing is repeated on all the pixels on one scanning line, the designated pixel is shifted to a pixel on the end of the adjacent scanning line and the same steps are repeated on the adjacent scanning line.

The width of the predetermined reference region (the size transverse to the main scanning direction or the sub-scanning direction) may be a width of one pixel and the length of the predetermined reference region (the size in the main scanning direction or the sub-scanning direction) may be determined according to how far two pixels may be spaced from each other in order for the pixels to be considered to be continuous. When the predetermined reference region includes three pixels in its longitudinal direction and the designated pixel is to be positioned at the middle thereof, the designated prospective non-halftone pixel is corrected to a halftone pixel only when it is adjacent to a halftone pixel.

When the redetermination processing or the correcting processing is repeated, the redetermination processing progresses in the direction in which the designated pixel is shifted. Accordingly, it is preferred that the designated pixel be shifted from left to right when the solid portion where the density is relatively high exists on the right side of the original and be shift right to left when the solid portion exists on the left side of the original.

When the solid portion continuous to the halftone region exists in the upper or lower part of the original fully across the original, that is, there is no halftone pixel on the left or right side of the solid portion, the prospective non-halftone pixels in the solid portion cannot be redetermined to be halftone pixels when the predetermined region extends by a plurality of pixels in the transverse direction, that is, when the designated pixel is shifted left to right or right to left, since there is no halftone pixel on the left or right side of the designated pixel.

This problem can be overcome by shifting the designated pixel top to bottom or bottom to top.

Similarly, when the solid portion continuous to the halftone region exists in the left or right part of the original fully across the original, that is, there is no halftone pixel on the upper or lower side of the solid portion, the prospective non-halftone pixels in the solid portion cannot be redetermined to be halftone pixels when the predetermined region extends by a plurality of pixels in the vertical direction, that is, when the designated pixel is shifted bottom to top or top to bottom, since there is no halftone pixel on the upper or lower side of the designated pixel.

This problem can be overcome by shifting the designated pixel left to right or right to left.

Otherwise, the problems may be overcome by setting the reference region to include two or more pixels in the direction transverse to the direction of shift of the designated pixel. That is when the reference region includes two or more pixels in the direction transverse to the direction of shift of the designated pixel, halftone pixels can necessarily exist in the reference region when the designated pixel is adjacent to the solid portion and accordingly, the prospective non-halftone pixels in the solid portion can be redetermined to be halftone pixels.

Accordingly, it is preferred that the direction of shift of the designated pixel and/or the size of the reference region be changed according to the condition of the solid portion continuous to the halftone region.

In accordance with a third aspect of the present invention, there is provided an apparatus for carrying out the method in accordance with the first aspect of the present invention. The apparatus is for distinguishing halftone pixels from non-halftone pixels in pixels making up an image according to a predetermined algorithm based on a result of edge detection for determining whether the pixels are edge pixels and is characterized by having a redetermination means which redetermines to be halftone pixels the pixels which have been determined to be non-halftone pixels according to said predetermined algorithm, are continuous to the pixels determined to be halftone pixels according to said predetermined algorithm including those which have been redetermined to be halftone pixels and are not lower than a predetermined threshold density in density.

In accordance with a fourth aspect of the present invention, there is provided an apparatus for carrying out the method in accordance with the second aspect of the present invention. The apparatus is for distinguishing halftone pixels from non-halftone pixels in pixels making up an image according to a predetermined algorithm based on a result of edge detection for determining whether the pixels are edge pixels, and is characterized by having a redetermination means which redetermines to be a halftone pixel each of the pixels which have been determined to be non-halftone pixels according to said predetermined algorithm and are not lower than a predetermined threshold density in density when the number of pixels which have been determined to be halftone pixels according to said predetermined algorithm including those which have been redetermined to be halftone pixels in a predetermined region including therein the relevant pixel is larger than a predetermined threshold number, the pixel to be determined whether it is redetermined to be a halftone pixel being shifted in sequence.

In accordance with the present invention, pixels in a region which is continuous to a halftone region and is relatively high in density are determined to be halftone pixels and are subjected to the tone image density conversion. Accordingly, there is no fear that a sharp difference in density is generated between the solid portion and the halftone region and gives an observer a sense of incompatibility.

Further, in accordance with the present invention, the pixels which have been determined to be halftone pixels can be never redetermined to be non-halftone pixels. Accordingly, the present invention does not cause any adverse effect.

DESCRIPTION OF THE PREFERRED EMBODIMENT

Figure 1:
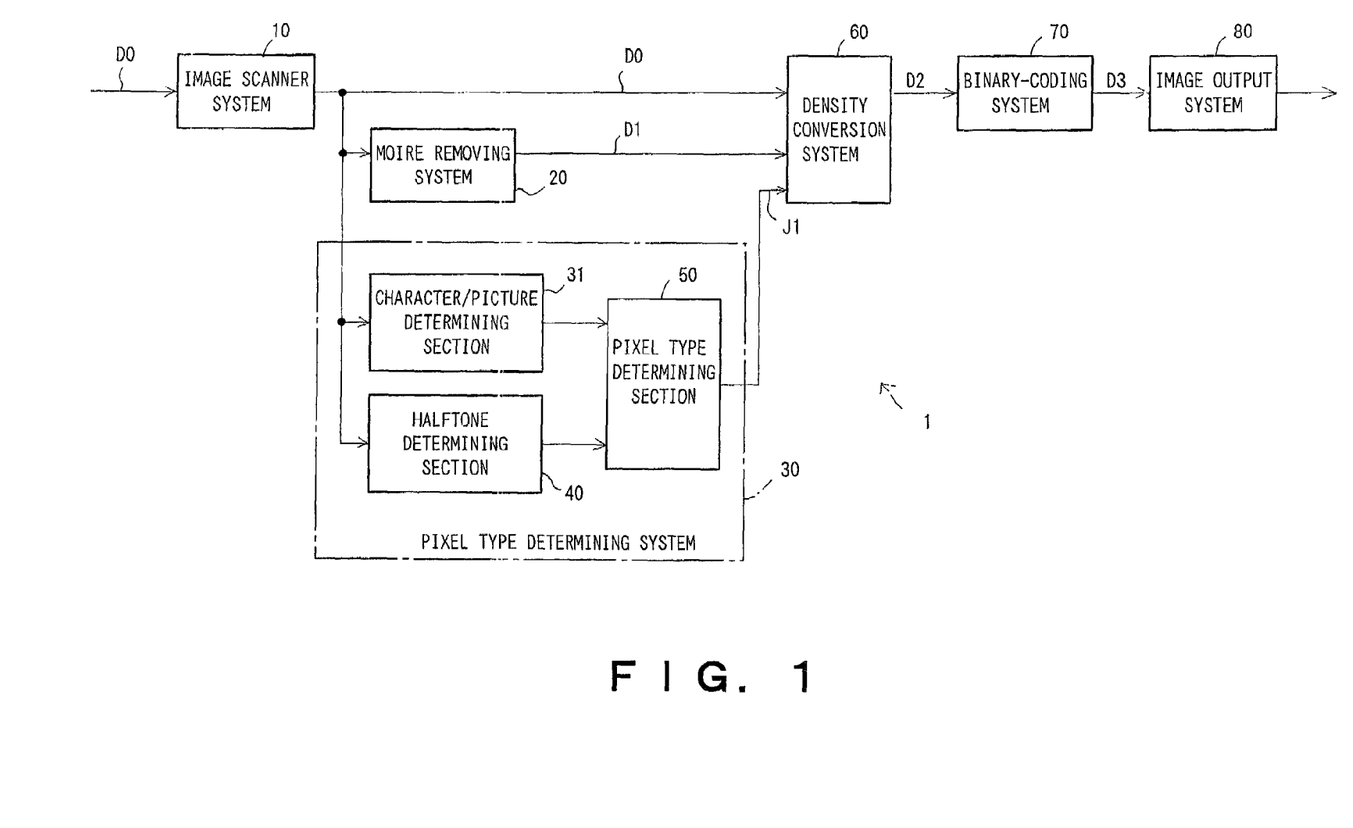
FIG. 1 is a block diagram showing an image processing apparatus provided with a pixel type distinguishing apparatus in accordance with an embodiment of the present invention.

In FIG. 1, an image processing apparatus 1 comprises an image scanner system 10 for taking in an image signal D0, a moiréremoving system 20 which removes moiré frequency components included when the image signal D0 represents a halftone image, a pixel type determining system 30 which determines the type of each pixel of the image signal D0, a density conversion system 60 which receives the raw image signal D0 as output from the image scanner system 10, a moiré-free image signal D1 output from the moiré removing system 20 and pixel type information J1 output from the pixel type determining system 30 and carries out on the raw image signal D0 and the moiré-free image signal D1 density conversion on the basis of the pixel type information J1, a binary coding system 70 which binary-codes an image signal D2 output from the density conversion system 60 by an error diffusion method or a dither method, and an image output system 80 which makes a stencil or makes print on the basis of the binary-coded image signal D3 output from the binary-coding system 70.

The moiré removing system 20 carries out smoothing processing on the image signal D0 by the use of a low-pass filter or the like and blurs halftone components.

The pixel type determining system 30 in accordance with an embodiment of the present invention comprises a character/picture determining section 31, a halftone determining section 40 and a pixel type determining section 50.

The character/picture determining section 31 determines whether each pixel of the raw image signal D0 read by the image scanner system 10 is of a character region or of a silver halide photographic region on the basis of the result of edge detection and density information.

The pixel type determining section 50 determines the type of each pixel (whether the pixel is a halftone pixel or a non-halftone pixel) of the raw image signal D0 read by the image scanner system 10 on the basis of the result of determination by the character/picture determining section 31 and the halftone determining section 40, and outputs the pixel type information J1 to the density conversion system 60.

The pixel type determining section 50 determines the type of each pixel giving priority to the result of determination by the halftone determining section 40 over the result of determination by the character/picture determining section 31. That is, pixels which are determined to be of a halftone region (to be a halftone pixel) by the halftone determining section 40 are determined to be a halftone region pixel by the pixel type determining section 50 irrespective of whether the character/picture determining section 31 determines the pixels to be of a character region or a picture region. Whereas as for pixels which are determined not to be of a halftone region by the halftone determining section 40, the pixel type determining section 50 determines the types of pixels as those determined by the character/picture determining section 31.

The density conversion system 60 carries out on the moiré-free image signal D1 density conversion for picture while the pixel type information J1 input from the pixel type determining system 50 represents that the pixels are of a halftone region, whereas the density conversion system 60 carries out on the raw image signal D0 density conversion for character or picture while the pixel type information J1 input from the pixel type determining system 50 represents that the pixels are of a picture region or of a character region.

Figure 2:
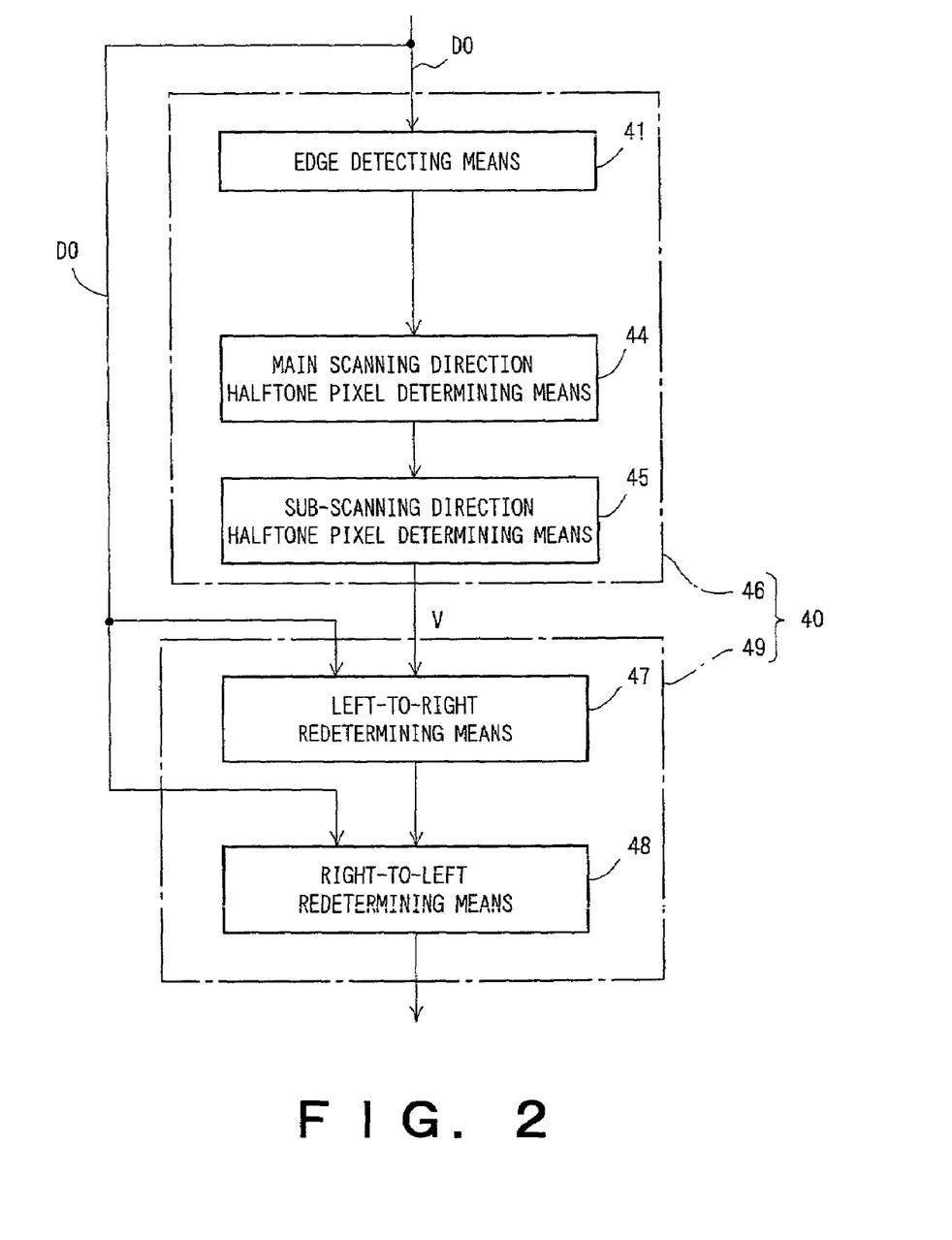
FIG. 2 is a block diagram showing in detail the halftone determining section in the image processing apparatus.

The halftone determining section 40 will be described in detail, hereinbelow.

As shown in detail in FIG. 2, the halftone determining section 40 comprises a primary halftone pixel determining means 46 and a redetermining means 49. The primary halftone pixel determining means 46 comprises an edge detecting means 41, a main scanning direction halftone pixel determining means 44 and a sub-scanning direction halftone pixel determining means 45. The redetermining means 49 comprises a left-to-right redetermining means 47 and a right-to-left redetermining means 48.

The primary halftone pixel determining means 46 automatically distinguishes pixels of a halftone region such as a halftone picture region and a screened region included in various documents such as a newspaper, a magazine, or a document made by means of a computer or a word processor. The primary halftone pixel determining means 46 is the same as the apparatus shown in FIG. 11 and distinguishes halftone pixels according to the same algorithm. Accordingly, the primary halftone pixel determining means 46 will not be described in detail here. As will be described later, the primary halftone pixel determining means 46 outputs a result of determination V which is "1" when the pixel is determined to be a halftone pixel and "0" when the pixel is determined to be a non-halftone pixel.

The redetermining means 49 corrects the result of determination V in such a manner that each of the pixels which have been determined to be non-halftone pixels by the primary halftone pixel determining means 46 and are not lower than a predetermined threshold density in density is redetermined to be a halftone pixel when the number of pixels which have been determined to be halftone pixels by the primary halftone pixel determining means 46 including those which have been redetermined to be halftone pixels by the redetermining means 49 in a predetermined region including therein the relevant pixel is larger than a predetermined threshold number.

When the halftone pixel distinguishment processing is carried out by the primary halftone pixel determining means 46 on an original including a halftone picture having a solid portion (a relatively high density portion which is expressed by a number of ink dots) smoothly merging into a halftone region expressed by halftone dots as shown in FIGS. 3A and 4A, the solid portion is not determined to be a halftone region but determined to be a non-halftone region, e.g., a character region (a binary image region) as shown in FIG. 3B, since there is detected no edge component in the solid portion.

Figure 3C:
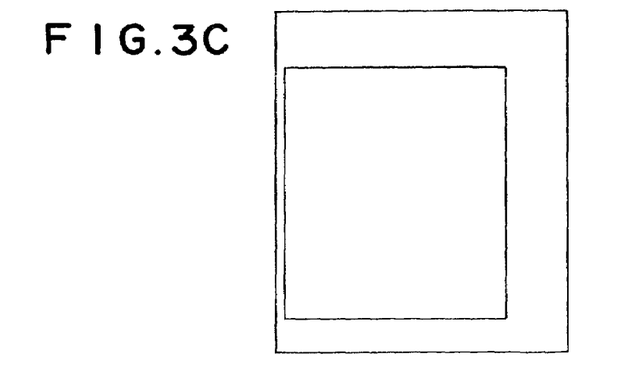
FIG. 3C is a view for illustrating an optimal result of the pixel type distinguishment.

However, the solid portion in the halftone picture should be determined to be a halftone region as shown in FIG. 3C. The redetermining means 49 corrects the result of determination V by the primary halftone pixel determining means 46 in the following manner.

Figure 5:
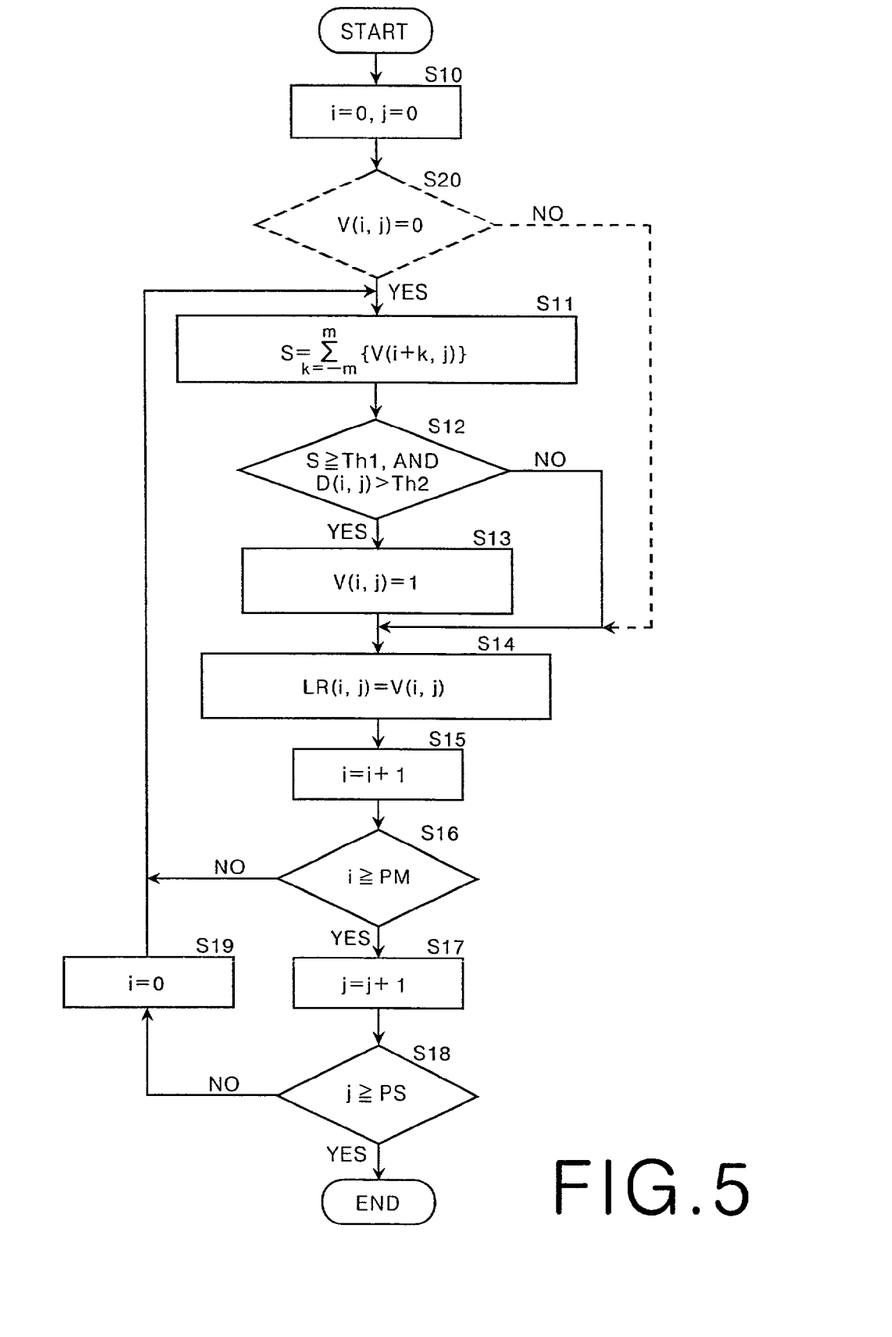
FIG. 5 is a flow chart for illustrating the manner in which the left-to-right redetermining means corrects the result of determination by the primary halftone pixel determining means.

In the case where a solid portion exists in the right part of a halftone picture as shown in FIG. 3A, the left-to-right redetermining means 47 of the redetermining means 49 corrects the result of determination V by the primary halftone pixel determining means 46 in the manner illustrated by the flow chart shown in FIG. 5.

In the flow chart shown in FIG. 5, pixel (0, 0) at the upper left corner of the original is first designated as the pixel to be subjected to operation of redetermining means 49, and the designated pixel is shifted one by one to the right (in the main scanning direction) and after the processing is carried out on all the pixels on one main scanning line, the designated pixel is shifted downward by one main scanning line.

That is, the designated pixel P(i, j) (i standing for the number of the pixel as numbered in the main scanning direction from the leftmost pixel and j standing for the number of the pixel as numbered in the sub-scanning direction from the uppermost pixel) is first to set P(0, 0). (step S10)

Then when this redetermination processing is to be carried out only on the prospective non-halftone pixels which are determined to be non-halftone pixels by the primary halftone pixel determining means 46, step S20 shown by the broken line in FIG. 5 is subsequently executed to determine whether the designated pixel P(i, j) is a prospective non-halftone pixel. To the contrary, when this redetermination processing is to be carried out on all the pixels, step S20 may be omitted and step S11 is executed immediately after step S10.

In step S11, the number S of pixels which have been determined to be halftone pixels by the primary halftone pixel determining means 46 in a reference region of (2m+1) pixels (in the main scanning direction)×one pixel (in the sub-scanning direction) is counted. In this particular embodiment, the reference region is set so that the designated pixel P(i, j) is positioned at the center of the region. That is, the pixels P(i+k, j) included in the reference region are P(i−m, j) to P(i+m, j). That is, since the result of determination V by the primary halftone pixel determining means 46 is 1 when the pixel is determined to be a halftone pixel and 0 the pixel is determined not to be a halftone pixel, by summing up the outputs of the primary halftone pixel determining means 46 for the pixels P(i−m, j) to P(i+m, j), the number S of such pixels can be counted.

It is further determined whether the number S of such pixels is larger than a first threshold value Th1 and at the same time the density of the designated pixel D(i, j) is higher than a second threshold value Th2. (step S12) When the two conditions are simultaneously satisfied (Yes to the question in step S12), then step S13 is executed and the result of determination V(i, j) is set to 1. Otherwise (No to the question in step S12), step S14 is executed without executing step S13. In step S14, the result of determination V(i, j) by the primary halftone pixel determining means 46 is employed as the result of redetermination LR(i, j) by the left-to-right redetermining means 47.

The reason why the result of determination V is set to 1 in step S13 is to use the corrected result of determination V(i, j) for the next designated pixel.

Steps S11 to S14 are repeated for all the pixels on the original (steps S15 to S19) In step S16, PM represents the number of pixels as numbered in the main scanning direction and in step S18 PS represents the number of pixels as numbered in the sub-scanning direction.

In accordance with the algorithm used in this embodiment, the pixels once determined to be halftone pixels cannot be redetermined to be non-halftone pixels irrespective of whether step S20 is executed.

FIGS. 6A to 6G are views for illustrating the algorithm used in the redetermination processing by the left-to-right redetermining means 47 through example. It is assumed here that the number of pixels in each of the reference region is 5 (2m+1=5) and the first and second threshold values are 1 and 100, respectively.

Figure 6A:
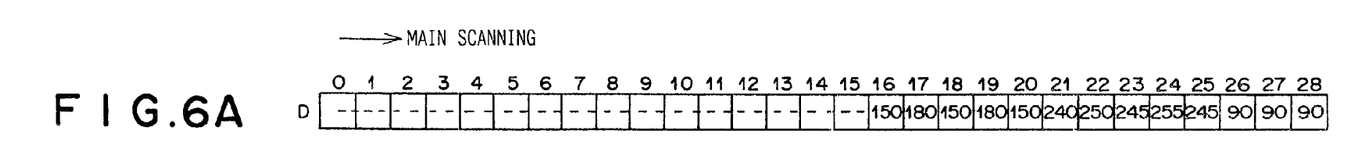
FIGS. 6A to 6G are views for illustrating the algorithm used in the redetermination processing by the left-to-right redetermining means through example.

Further, it is assumed that the values of density of pixels on one main scanning line are as shown in FIG. 6A. That is, it is assumed that the values of density of pixels P(21, j) to P(25, j) are all higher than 100, and the values of density of pixels P(26, j) to P(28, j) are all lower than 100. The values of density of pixels P(0, j) to P(15, j) are not related to this processing and are not expressed here.

Figure 6B:
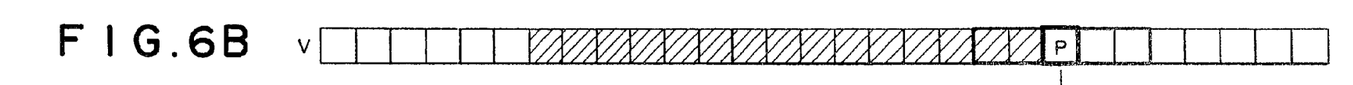

Further, it is assumed that the result of determination V(i, j) by the primary halftone pixel determining means 46 for the pixels shown in FIG. 6A is as shown in FIG. 6B. That is, hatched pixels in FIG. 6B have been determined to be halftone pixels (V=1) and the other pixels have been determined to be prospective non-halftone pixels (V=0).

Figure 6C:
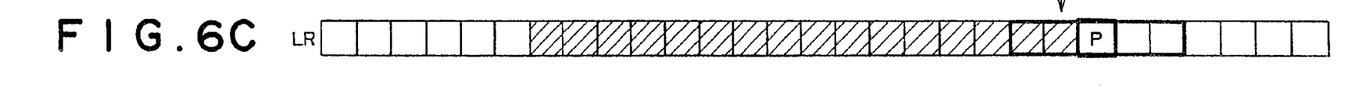
Figure 6D:
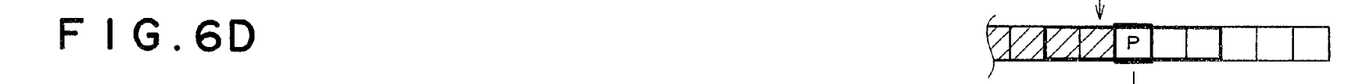
Figure 6E:
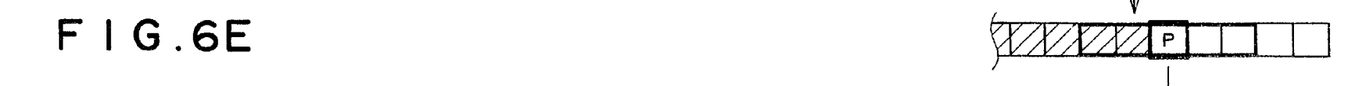
Figure 6F:
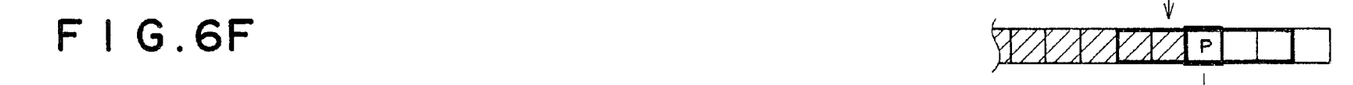
Figure 6G:
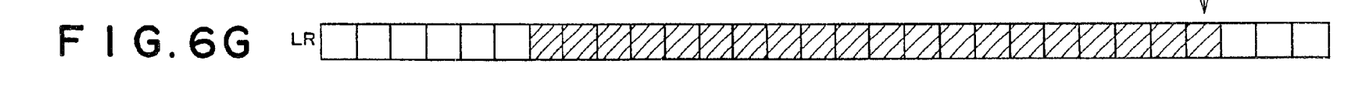

When pixel P(21, j) is designated as shown in FIG. 6B, two pixels in the reference region, i.e., P(19, j) and P(20, j), have been determined to be halftone pixels and at the same time the value of density of the designated pixel P(21, j) is higher than the second threshold value Th2 (100). Accordingly, the designated pixel P(21, j) is redetermined to be a halftone pixel as shown in FIG. 6C. Then the same processing is repeated with the designated pixel shifted rightward. The same result is obtained up to pixel P(25,j) since the preceding pixel has been redetermined to be a halftone pixel and the value of density of the designated pixel is higher than the second threshold value Th2 (100) as shown in FIGS. 6D to 6F. However, when pixel P(26, j) is designated, the designated pixel is not redetermined to be a halftone pixel as shown in FIG. 6G since the value of density of the designated pixel P(26, j) is lower than the second threshold value Th2 (100) though two pixels in the reference region, i.e., P(24, j) and P(25, j), have been determined to be halftone pixels. Further, when pixel P(27, j) is designated, the designated pixel is not redetermined to be a halftone pixel as shown in FIG. 6G since the value of density of the designated pixel P(26, j) is lower than the second threshold value Th2 (100) and only one pixel in the reference region, i.e., P(25, j), has been determined to be a halftone pixel. Thus all the pixels in the solid portion are redetermined to be halftone pixels.

In the left-to-right redetermining means 47, the redetermination processing progresses left to right. Accordingly, the left-to-right redetermining means 47 can redetermine all the pixels in a solid portion when the solid portion exists in the right part of a halftone picture as shown in FIG. 3A. However the left-to-right redetermining means 47 can redetermine only a part of the pixels in a solid portion when the solid portion exists in the left part of a halftone picture as shown in FIG. 4A.

FIGS. 7A to 7G are views for illustrating this problem. It is assumed here that the number of pixels in each of the reference region is 5 (2m+1=5) and the first and second threshold values are 1 and 100, respectively.

Figure 7A:
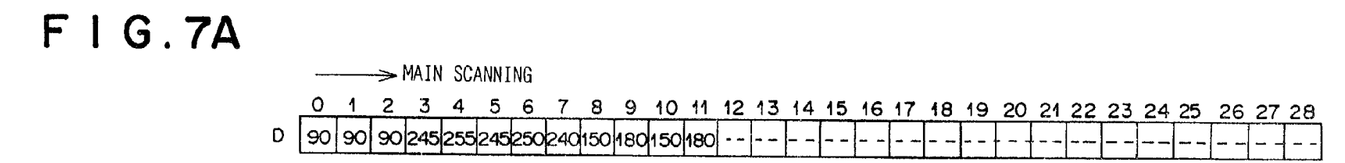
FIGS. 7A to 7G are views for illustrating an example of drawback caused when the redetermination processing is carried out by the left-to-right redetermining means.

Further, it is assumed that the values of density of pixels on one main scanning line are as shown in FIG. 7A. That is, it is assumed that the values of density of pixels P(3, j) to P(11, j) in the solid portion are all higher than 100, and the values of density of pixels P(0, j) to P(2, j) are all lower than 100. The values of density of pixels P(12, j) to P(28, j) are not related to this processing and are not expressed here.

Figures 7B, 7C, 7D, 7E:
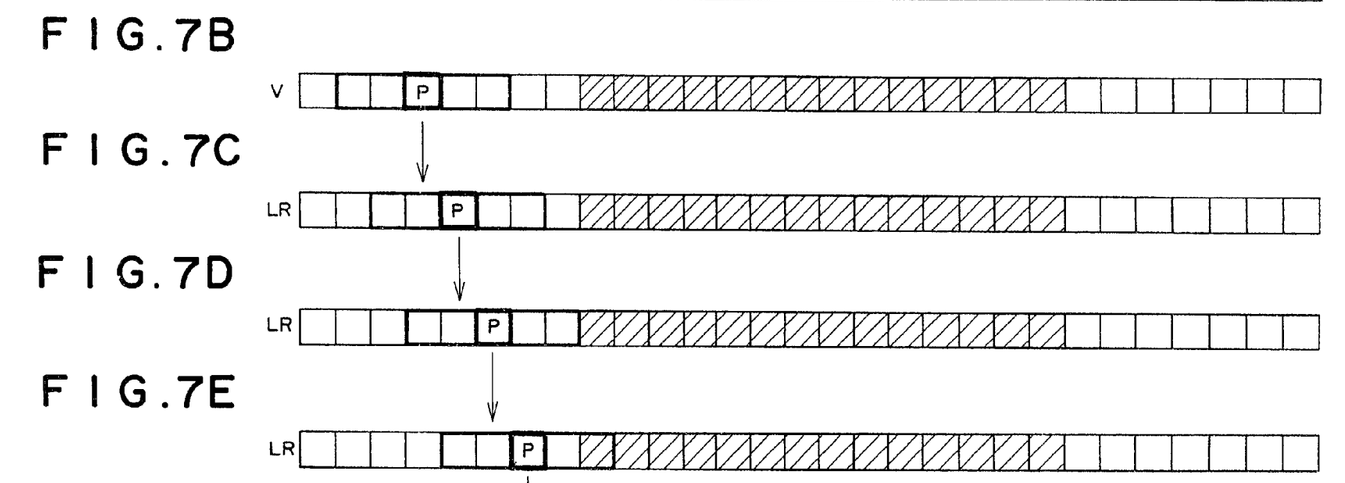

Further, it is assumed that the result of determination V(i, j) by the primary halftone pixel determining means 46 for the pixels shown in FIG. 7A is as shown in FIG. 7B. That is, hatched pixels in FIG. 7B have been determined to be halftone pixels (V=1) and the other pixels have been determined to be prospective non-halftone pixels (V=0).

Figure 7F:
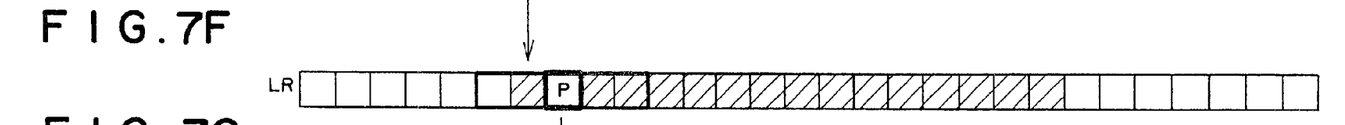
Figure 7G:
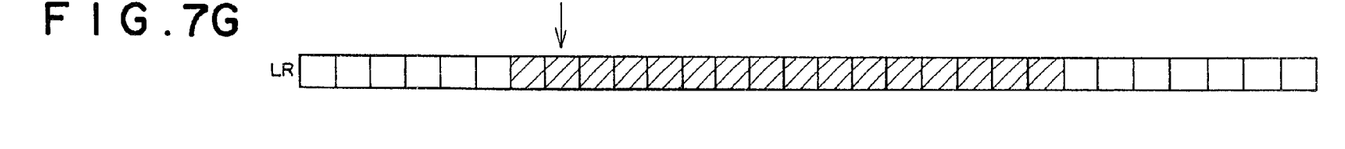

The problem which arises when the redetermination processing is carried out on the pixels shown in FIGS. 7A and 7B by the left-to-right redetermining means 47 will be described, hereinbelow. When pixel P(3, j) is designated as shown in FIG. 7B, no pixel in the reference region has been determined to be a halftone pixel. Accordingly, the designated pixel P(3, j) is not redetermined to be a halftone pixel as shown in FIG. 7C. The same result is obtained up to pixel P(5, j) as shown in FIGS. 7C and 7D. That is, the designated pixel is not redetermined to be a halftone pixel until pixel P(6, j) is designated as shown in FIGS. 7E to 7G.

As can be seen from the description above, when a solid portion exists in the left part of a halftone picture, a part of the pixels in the solid portion cannot be redetermined to be a halftone pixel by the left-to-right redetermining means 47, where the designated pixel is shifted left to right.

Figure 8:
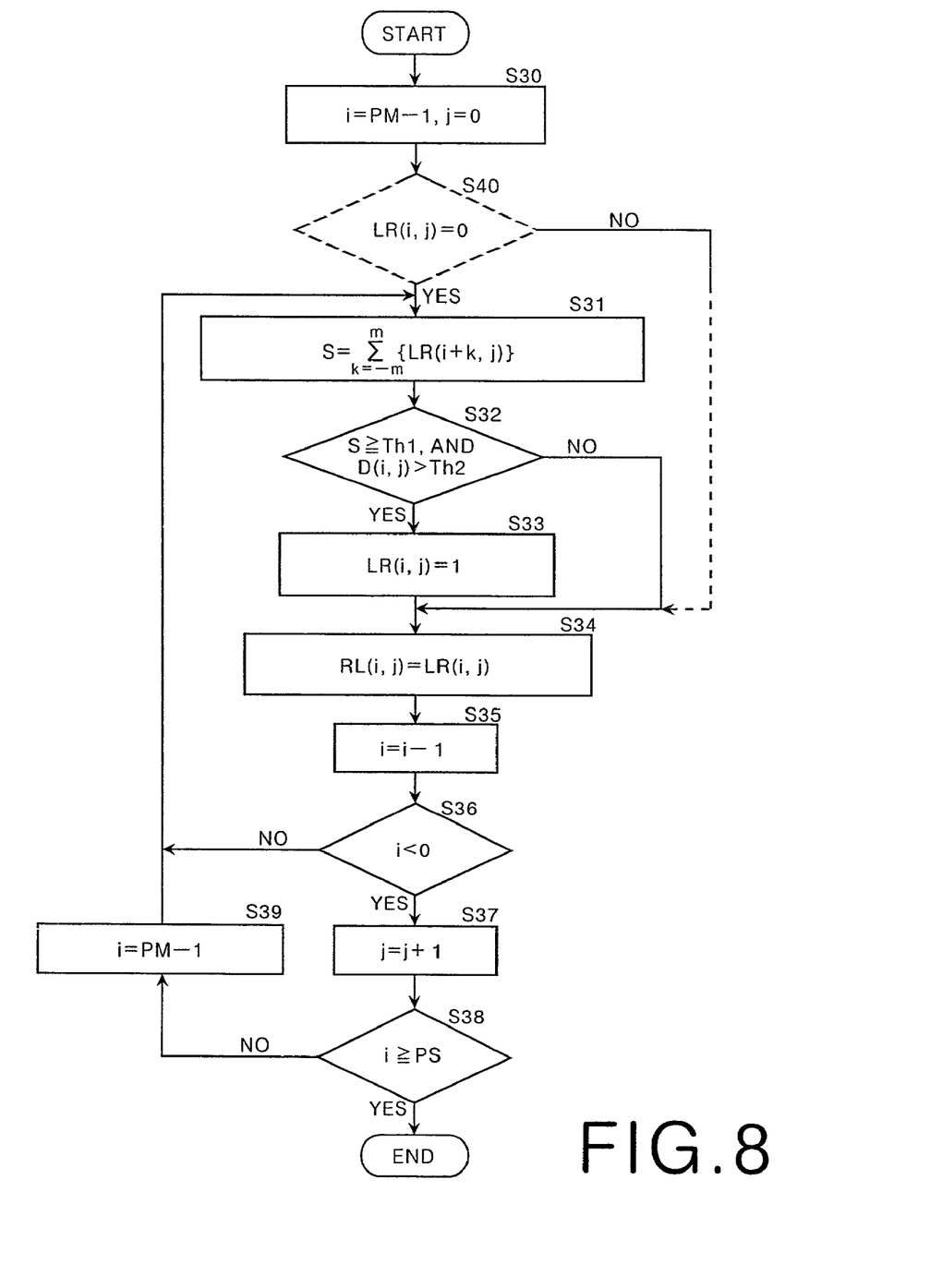
FIG. 8 is a flow chart for illustrating the manner in which the right-to-left redetermining means corrects the result of determination by the primary halftone pixel determining means.

In such a case, the right-to-left redetermining means 48 is operated. FIG. 8 shows a flow chart for illustrating the processing executed by the right-to-left redetermining means 48. The processing shown in FIG. 8 is executed after the processing shown in FIG. 5. That is, in this particular embodiment, the left-to-right redetermining means 47 is first operated and then the right-to-left redetermining means 48 is operated. However, the latter may be operated prior to the former.

The flow chart shown in FIG. 8 is substantially the same as that shown in FIG. 5 except the following. The value of i is initially set to be PM-1 and the designated pixel is shifted right to left. (steps S30, S35 and S36) The result of determination LR(i, j) by the left-to-right redetermining means 47 is corrected in place of the result of determination V(i, j) by the primary halftone pixel determining means 46. (steps S31 and S33)

Thus, in this particular embodiment, the redetermining processing is first carried out on the result of determination by the primary halftone pixel determining means 46 left to right by the left-to-right redetermining means 47 and then on the result of determination by the left-to-right redetermining means 47 right to left by the right-to-left redetermining means 48. Accordingly, all the pixels in a solid portion can be redetermined to be halftone pixels irrespective of whether the solid portion is in the left part or the right part of a halftone picture.

As described above, when a solid portion continuous to a halftone region exists in the upper or lower part of the original fully across the original, that is, there is no halftone pixel on the left or right side of the solid portion, the prospective non-halftone pixels in the solid portion cannot be redetermined to be halftone pixels when the designated pixel is shifted left to right or right to left, since there is no halftone pixel on the left or right side of the designated pixel.

This problem can be overcome by shifting the designated pixel top to bottom when a solid portion continuous to a halftone region exists in the lower part of the original fully across the original and bottom to top when a solid portion continuous to a halftone region exists in the upper part of the original fully across the original.

Otherwise, the problem may be overcome even if the designated pixel is shifted left to right or right left by setting the reference region to include two or more pixels in the vertical direction.

Figure 9:
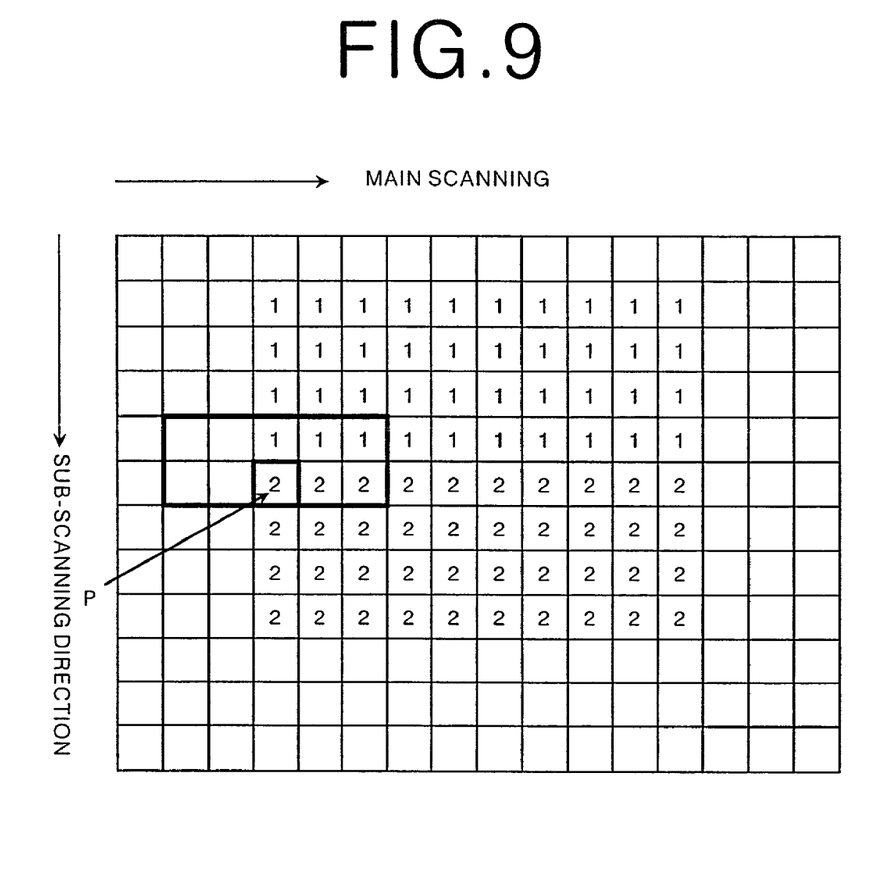
FIG. 9 is a view for illustrating a method of correcting the result of determination by the primary halftone pixel determining means when a solid portion exists in the lower part of a halftone picture.

For example, when five pixels on the main scanning line just above the main scanning line of the designated pixel P is added to the reference region as shown in FIG. 9 and the designated pixel P is shifted first left to right or right to left and then downward, halftone pixels can necessarily exist in the reference region when the designated pixel is on the uppermost main scanning line of the solid portion (in FIG. 9, pixels which have been determined to be halftone pixels are indicated at 1 and pixels in the solid portion are indicated at 2) and accordingly, the prospective non-halftone pixels in the solid portion can be all redetermined to be halftone pixels.

Figure 10:
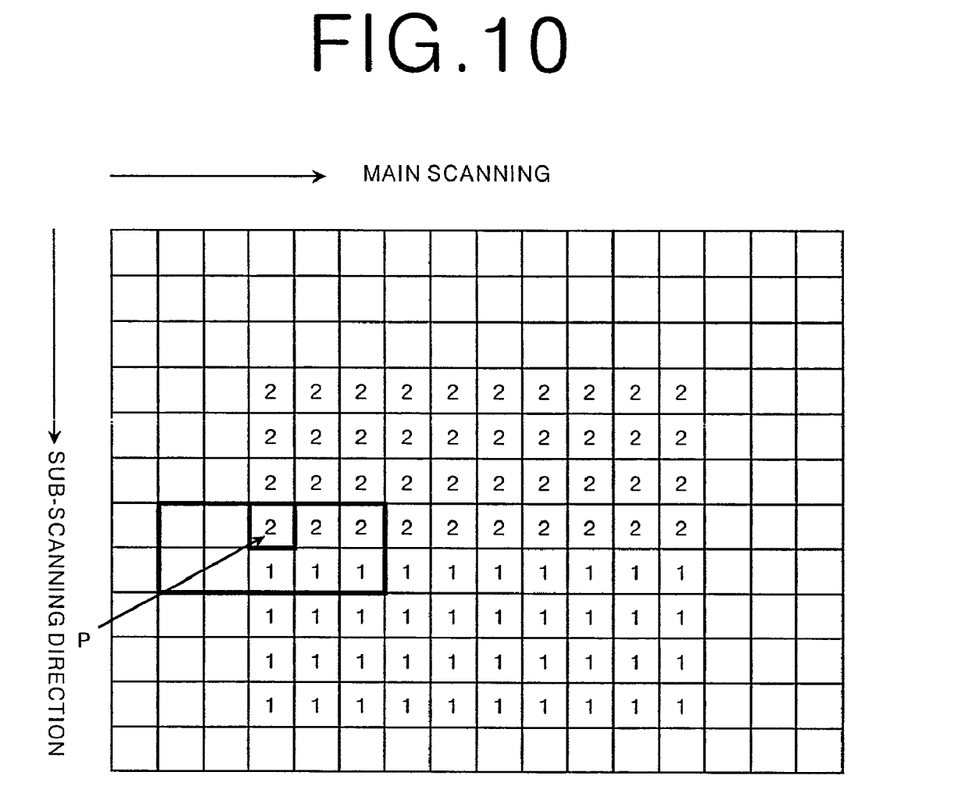
FIG. 10 is a view for illustrating a method of correcting the result of determination by the primary halftone pixel determining means when a solid portion exists in the upper part of a halftone picture.

Similarly, when five pixels on the main scanning line just below the main scanning line of the designated pixel P is added to the reference region as shown in FIG. 10 and the designated pixel P is shifted first left to right or right to left and then upward, halftone pixels can necessarily exist in the reference region when the designated pixel P is on the lowermost main scanning line of the solid portion (in FIG. 10, pixels which have been determined to be halftone pixels are indicated at 1 and pixels in the solid portion are indicated at 2) and accordingly, the prospective non-halftone pixels in the solid portion can be all redetermined to be halftone pixels.

Accordingly, by changing the direction of shift of the designated pixel and/or the size of the reference region according to the condition of the solid portion continuous to the halftone region or by carrying out the redetermination processing in all the directions, all the pixels in a solid portion can be surely redetermined to be halftone pixels irrespective of what part of a halftone picture the solid portion is in.

What is claimed is:

1. A method of determining a halftone area in image data, said method comprising:
    a first step of determining whether or not each pixel in said image data is an edge pixel;
    a second step of determining whether each pixel in said image data is a halftone pixel or a non-halftone pixel, according to a predetermined algorithm based on the result of said first step; and
    a third step of correcting the result of the second step by changing a non-halftone pixel to the halftone pixel determined at the second step or a halftone pixel previously corrected at a previously corrected third step and has a density equal to or higher than a threshold density, to a halftone pixel.

2. The method according to claim 1,
    wherein, in said third step, the result of said second step is corrected by firstly scanning said image data in one of a direction from left to right and a direction from right to left, and then, secondary scanning said image data in a reverse direction of the firstly scanning.

3. The method according to claim 1,
    wherein, in said third step, the result of said second step is corrected by firstly scanning said image data in one of a direction from top to bottom and a direction from bottom to top, and then, secondary scanning said image data in a reverse direction of the firstly scanning.

4. A method of distinguishing halftone pixels from non-halftone pixels in image data, said method comprising:
    a first step of determining whether each pixel in said image data is an edge pixel or not;
    a second step of determining whether each pixel in said image data is a halftone pixel or a non-halftone pixel, according to a predetermined algorithm based on the result of said first step; and
    a third step of correcting the result of the second step, including the steps of:
    setting a reference region having a predetermined size and including at least a non-halftone pixel;
    counting a number of halftone pixels determined at the second step and halftone pixels previously corrected at a previously corrected third step within said reference region; and
    if the counted number is larger than a threshold number and said non-halftone pixel has a density equal to or higher than a threshold density, changing said non-halftone pixel to a halftone pixel.

5. The method according to claim 4,
    wherein, in said third step, the result of said second step is corrected by firstly scanning said image data in one of a direction from left to right and a direction from right to left, and then, secondary scanning said image data in a reverse direction of the firstly scanning.

6. The method according to claim 4,
    wherein, in said third step, the result of said second step is corrected by firstly scanning said image data in one of a direction from top to bottom and a direction from bottom to top, and then, secondary scanning said image data in a reverse direction of the firstly scanning.

7. An apparatus for determining a halftone area in image data, comprising:
    edge detecting means which detects whether each pixel in said image data is an edge pixel or not;

halftone pixel determining means which determines
whether each pixel is a halftone pixel or a non-halftone
pixel according to a predetermined algorithm based on
the result obtained by said edge detecting means; and redetermining means which corrects the result obtained
from said halftone pixel determining means by changing a non-halftone pixel to the halftone pixel.

8. The apparatus according to claim 7,
wherein said redetermining means corrects the result
obtained by said halftone pixel determining means by
firstly scanning said image data in one of a direction
from left to right and a direction from right to left, and
then, secondary scanning said image data in a reverse
direction of the firstly scanning.

9. The apparatus according to claim 7,
wherein said redetermining means corrects the result
obtained by said halftone pixel determining means by
firstly scanning said image data in one of a direction
from top to bottom and a direction from bottom to top,
and then, secondary scanning said image data in a
reverse direction of the firstly scanning.

10. An apparatus for determining a halftone area in image data, comprising:
edge detecting means which detects whether each pixel in said image data is an edge pixel or not;
halftone pixel determining means which determines whether each pixel is a halftone pixel or a non-halftone pixel according to a predetermined algorithm based on the result obtained by said edge detecting means; and
redetermining means which corrects the result obtained from said halftone pixel determining means by:
setting a reference region having a predetermined size and including at least a non-halftone pixel; counting a number of the halftone pixels determined by said halftone pixel determining means and halftone pixels previously corrected by said redetermining means within said reference region; and if the counted number is larger than a threshold number and said non-halftone pixel has a density equal to or higher than a threshold density, changing said non-halftone pixel to a halftone pixel.

11. The apparatus according to claim 10,
wherein said redetermining means corrects the result
obtained by said halftone pixel determining means by
firstly scanning said image data in one of a direction
from left to right and a direction from right to left, and
then, secondary scanning said image data in a reverse
direction of the firstly scanning.

12. The apparatus according to claim 10,
wherein said redetermining means corrects the result
obtained by said halftone pixel determining means by
firstly scanning said image data in one of a direction
from top to bottom and a direction from bottom to top,
and then, secondary scanning said image data in a
reverse direction of the firstly scanning.

* * * * *